UNITED STATES PATENT OFFICE.

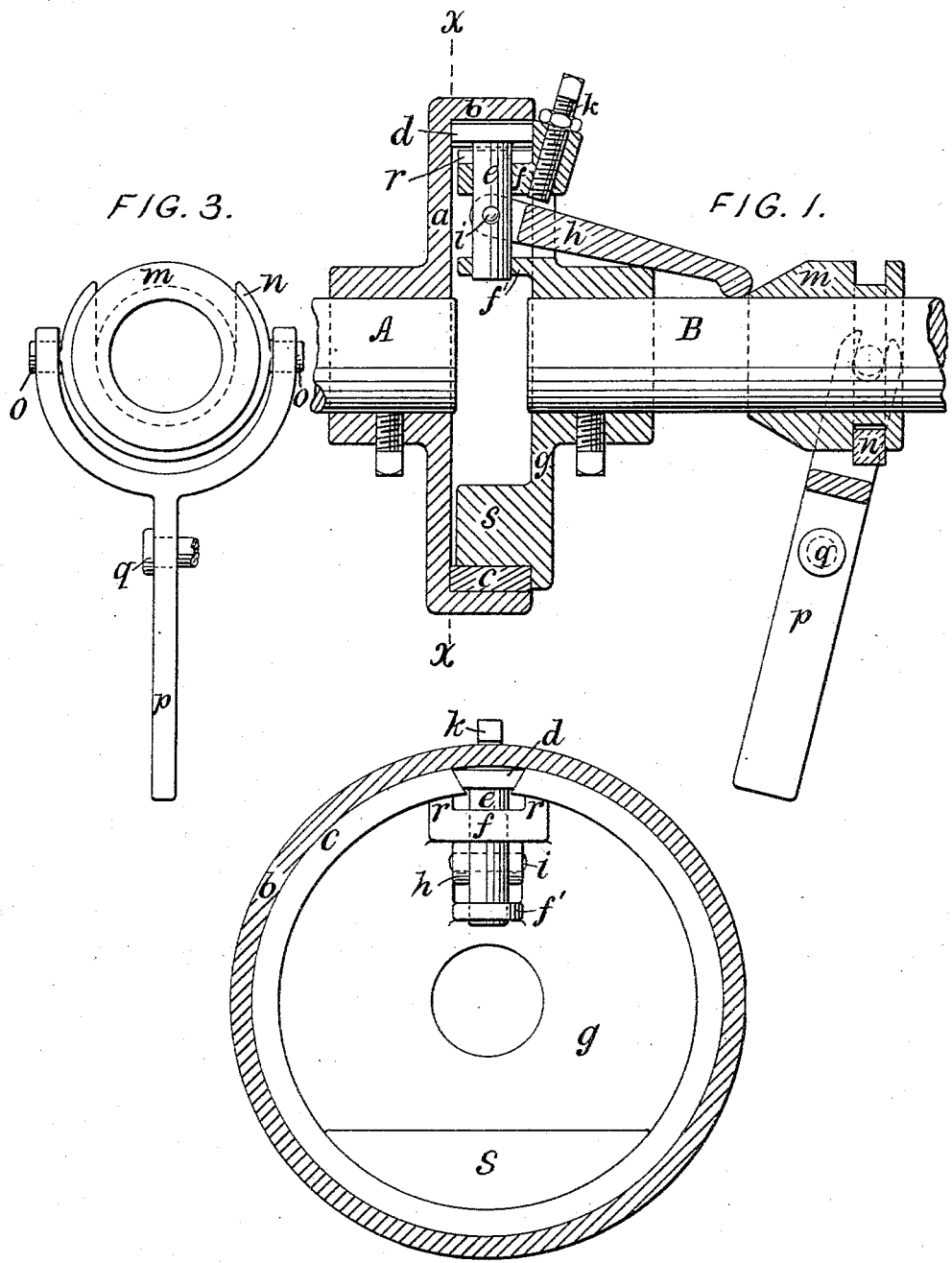

EDWARD D. MACKINTOSH, OF BROOKLYN, ASSIGNOR OF ONE-HALF TO PAUL PRYIBIL, OF NEW YORK, N. Y.

CLUTCH.

SPECIFICATION forming part of Letters Patent No. 339,310, dated April 6, 1886.

Application filed January 18, 1886. Serial No. 188,877. (No model.)

*To all whom it may concern:*

Be it known that I, EDWARD D. MACKINTOSH, of Brooklyn, in the county of Kings and State of New York, have invented certain new and useful Improvements in Clutches, of which the following is a description.

My invention relates to that class of clutches whereby two shafts, or a pulley and a shaft, or a gear-wheel and a shaft, are so coupled by the engagement of frictional surfaces that power applied to one will revolve both.

Referring to the drawings forming part of this specification, and to the letters of reference marked thereon, Figure 1 is a section through the axis of my clutch as applied to coupling two shafts. Fig. 2 is a section at the line $x\ x$ of Fig. 1. Fig. 3 is an end view of some of the parts shown in Fig. 1.

One of the shafts, A and B, to be coupled has fixed to it a plate, $a$, provided with a cylindrical rim, $b$, within which is loosely fitted a divided ring, $c$, having inwardly-converging ends. Between the ends of the divided ring is fitted a wedge, $d$, provided with a stem, $e$, extending radially inward, and passing loosely through lugs $f\ f'$, formed on a plate, $g$. Parts $r\ r$ of the lug $f$ serve also as internal supports for the ends of the divided ring $c$. A projection, $s$, formed upon the plate $g$, gives additional support to the divided ring $c$, and serves also as a counter-balance to the parts shown at the top of Fig. 1. A lever, $h$, extending through a hole in the plate $g$, is loosely pivoted at one end to the wedge-stem $e$, and is so arranged that when swung outward it will come into contact with a screw, $k$, held in a lug on the plate $g$ outside of the lever $h$.

The shaft B, to be coupled to the shaft A by my device, is fixed to the plate $g$, and is loosely encircled by a conical sleeve, $m$, provided with a circumferential groove, into which is loosely fitted an open-sided or U-shaped collar, $u$, provided with trunnions $o$. A lever, $p$, pivoted at $q$ to any suitable support, engages with the trunnions $o$, as clearly shown by the drawings.

Such being the construction, the operation is as follows: The drawings show the clutch in its inoperative condition. The wedge $d$ is at the extreme of its outward movement, further motion being prevented by the contact of the pivoted end of the lever $h$ and the lug $f$, the wedge being thus prevented from touching the cylindrical rim $b$. The divided ring $c$ is resting on the supports $r\ r\ s$, and is close to but out of actual frictional contact with the cylindrical rim $b$. Thus either of the shafts A or B is free to revolve with its connected parts without affecting the other. If, now, the conical sleeve $m$ be forced toward the plate $g$ by means of the lever $p$ and collar $u$, the lever $h$ will be pushed outward until it comes into contact with the set-screw $k$, which then forms a fulcrum to the lever, and further motion of the latter acts to draw radially inward the stem $e$ and the wedge $d$. As the ends of the divided ring $c$ rest upon the internal supports, $r\ r$, the former are prevented from springing inward, and therefore the above-described movement of the wedge $d$ results in pushing apart the ends of the divided ring and expanding the latter into forcible contact with the cylindrical rim $b$, thus effecting a coupling by friction of the cylindrical rim $b$ and the divided ring $c$. As the wedge $d$ and its attached stem $e$ engage, respectively, with the divided ring $c$ and the plate $g$, the independent rotation of the latter parts is prevented, and coupling the divided ring to the cylindrical rim is equivalent to coupling the plates $g$ and $a$ and their shafts B and A. The divided ring $c$ is made with sufficient elasticity to force the wedge $d$ outward, and to contract away from the cylindrical rim $b$ into contact with the internal supports, $r\ r\ s$, when the cylindrical sleeve $m$ is returned to the position shown in Fig. 1. By turning the screw $k$, forming the fulcrum of the lever $h$, the amount of movement imparted to the wedge $d$ by the operation of the conical sleeve $m$ may be regulated, and thus the expansion of the divided ring $c$ and the resulting friction varied.

Although I have shown my clutch as adapted to the coupling of two shafts, it is evident that both parts may be placed on one continuous shaft, to which the plate $g$ may be secured, and that the plate $a$ may be attached to a pulley on a gear-wheel mounted loosely on the shaft, with which it will revolve when the clutch is made operative.

I am aware that divided rings fitting loosely within cylindrical rims, and provided with levers, and with toggles fitted between the ends of the divided ring for the purpose of expanding the latter, have been used before. I therefore do not broadly claim the combination of a cylindrical rim and a divided ring with mechanism acting between the ends of the latter to expand it; but What I do claim as new, and desire to secure by Letters Patent, is—

1. In a shafting-clutch, the combination of a divided ring with inwardly-converging ends, a wedge-shaped block fitting between the ends of the divided ring and provided with an inwardly-extending stem, and bearings confining the stem and permitting only a radial movement of the wedge-shaped block, substantially as described, and for the purpose specified.

2. In a shafting-clutch, the combination of a divided ring with inwardly-converging ends, a wedge-shaped block fitting between the ends of the divided ring and provided with an inwardly-extending stem, bearings confining the stem and permitting only a radial movement of the wedge, and a lever pivoted to the stem and arranged to move the wedge radially inward, substantially as described, and for the purpose specified.

3. The combination, in a shafting-clutch, of a divided ring with inwardly-converging ends, a wedge shaped block fitting between the ends of the divided ring and provided with an inwardly-extending stem, bearings confining the stem and permitting only a radial movement of the wedge-shaped block, a lever pivoted to the stem and arranged to move the wedge radially inward, and a screw forming an adjustable fulcrum outside of the lever, substantially as described, and for the purpose specified.

EDWARD D. MACKINTOSH.

Witnesses:
C. AUGUST SCHOPPER,
HENRY R. BACKER, Jr.